US008490322B2

(12) United States Patent
Dobias et al.

(10) Patent No.: US 8,490,322 B2
(45) Date of Patent: Jul. 23, 2013

(54) ANIMAL TRAP WITH COLLAPSIBLE ARM

(75) Inventors: Scott F. Dobias, Powell, OH (US); Mou Li Lin, Tainan (TW); Tsung Yi Chung, Tainan (TW); Di Jun Yan, Hanyang (CN); Thomas Paul Danniger, Ostrander, OH (US); Kenneth E. Schlack, Powell, OH (US)

(73) Assignee: OMS Investments, Inc., Los Angeles, CA (US)

(*) Notice: Subject to any disclaimer, the term of this patent is extended or adjusted under 35 U.S.C. 154(b) by 215 days.

(21) Appl. No.: 12/838,092

(22) Filed: Jul. 16, 2010

(65) Prior Publication Data

US 2012/0011764 A1  Jan. 19, 2012

(51) Int. Cl.
*A01M 23/30* (2006.01)
*A01M 23/24* (2006.01)
*A01M 23/26* (2006.01)

(52) U.S. Cl.
USPC ........................................ 43/81; 43/90; 43/92

(58) Field of Classification Search
USPC .................. 43/81, 88, 90, 92, 93, 95
See application file for complete search history.

(56) References Cited

U.S. PATENT DOCUMENTS

| 391,118 | A | * | 10/1888 | Castle ............................ 43/81 |
| 2,068,492 | A | * | 1/1937 | Johnson ........................... 43/83 |
| 2,321,617 | A | * | 6/1943 | Peterson ...................... 43/83.5 |
| 2,428,721 | A | * | 10/1947 | Peterson ...................... 43/83.5 |
| 2,724,209 | A | * | 11/1955 | Cain .............................. 43/83.5 |
| 2,778,149 | A | * | 1/1957 | Edwards ....................... 43/83.5 |
| 4,665,644 | A |  | 5/1987 | Vajs |
| D320,833 | S |  | 10/1991 | Lumsden |
| D323,016 | S |  | 1/1992 | Vajs |
| 5,337,512 | A |  | 8/1994 | Krenzler |
| 6,508,031 | B1 |  | 1/2003 | Johnson et al. |
| D532,478 | S |  | 11/2006 | Wiesener |
| D616,958 | S |  | 6/2010 | Huang |

FOREIGN PATENT DOCUMENTS

GB         233219         5/1925

OTHER PUBLICATIONS

International Search Report with Written Report from PCT/US2011/044197; Dec. 12, 2011.

* cited by examiner

*Primary Examiner* — Darren W Ark
*Assistant Examiner* — Kathleen Iwasaki
(74) *Attorney, Agent, or Firm* — Hunton & Williams LLP

(57) ABSTRACT

An animal trap has a base, an upper jaw pivotally coupled with the base so that it is movable between a closed position and an open position, and a set arm that is pivotally coupled with the upper jaw and moveable between a collapsed position and an open position. In its open position, the set arm provides a lever whereby application of a force to the set arm moves the upper jaw toward its open position. A method for trapping an animal includes moving a trap between a first position, where the upper jaw is closed, and the set arm is collapsed, and a second position, where the upper jaw is closed and the set arm is open. The method further includes the step of moving the trap between a second position and a third position in which the upper jaw is open, and the set arm is open.

19 Claims, 9 Drawing Sheets

ANIMAL TRAP WITH COLLAPSIBLE ARM

This application is related to U.S. Design patent application No. 29/365,929 filed Jul. 16, 2010, entitled "Animal Trap," and to U.S. Design patent application No. 29/365,930 filed Jul. 16, 2010, entitled "Animal Trap," the contents of which are incorporated herein in their respective entirety to the extent that it is consistent with this invention and application.

BACKGROUND

1. Field of the Art

The present embodiments relate to animal traps in general, and more particularly to traps for rodents or other small animals.

2. Description of Related Art

Animal and rodent traps have been in use for many years. A variety of trap designs have been used to trap rodents. One type of trap resembles a snapping jaw, such as the trap described in U.S. Pat. No. 2,321,617 to H. J. Peterson, entitled "Mouse Trap," which is incorporated herein by reference in its entirety. Generally, a snapping jaw type of trap has an upper jaw pivotally mounted to a base or lower jaw. In use, the jaws are initially set to an open position. When triggered, the jaws snap closed to trap an animal therebetween. In some traps, an arm or handle may protrude from the upper jaw to provide a load bearing surface useful for opening the jaw and setting the trap. A trap having a protruding arm or flange may be difficult to package, ship, and distribute efficiently.

SUMMARY

In view of the foregoing, one or more embodiments include an animal trap having a collapsible set arm. The set arm may be moved to a collapsed position to reduce the overall profile of the trap, such as for packaging, shipping and distribution purposes. The set arm may move to an open position, such as when the trap is ready to be used.

At least one embodiment provides an animal trap having a base, an upper jaw pivotally coupled with the base so that it moves between an open position and a closed position, and a set arm pivotally coupled with the upper jaw. The set arm is moveable between a collapsed position and an open position. The open angle between the collapsed position and the open position is from about 10 degrees to about 170 degrees. In its open position, the set arm provides a lever whereby application of a force to the set arm moves the upper jaw toward its open position.

At least one embodiment provides an animal trap having a base, an upper jaw pivotally connected with the base, a set arm pivotally connected with the upper jaw, and a latching mechanism. The upper jaw is moveable between a closed position and an open position. The set arm is moveable between a collapsed position and an open position in which the set arm provides a lever whereby application of a force to the set arm moves the upper jaw toward its open position. The latching mechanism has a latched position and an unlatched position. The trap has a first position in which the in which the upper jaw is in the closed position, the set arm is in the collapsed position, and the latching mechanism is in the unlatched position. The trap further has a second position in which the upper jaw is in the closed position, the set arm is in the open position, and the latching mechanism is in the unlatched position. The trap further has a third position in which the upper jaw is in the open position, the set arm is in the open position, and the latching mechanism is in the latched position.

At least one embodiment provides a method of trapping an animal. The method includes providing a trap having a base, an upper jaw pivotally connected to the base, a set arm pivotally connected to the upper jaw, and a latching mechanism. According to the method, the upper jaw is moveable between a closed position and an open position; the set arm is moveable between a collapsed position and an open position; and the latching mechanism has a latched position and an unlatched position. The method further includes moving the trap between a first position wherein the upper jaw is in the closed position, the set arm is in the collapsed position, and the latching mechanism is in the unlatched position, and a second position, wherein the upper jaw is in the closed position, the set arm is in the open position, and the latching mechanism is in the unlatched position. The method further includes moving the trap between the second position and a third position in which the upper jaw is in the open position, the set arm is in the open position, and the latching mechanism is in the latched position.

BRIEF DESCRIPTION OF THE DRAWINGS

In order to facilitate a fuller understanding of the exemplary embodiments, reference is now made to the appended drawings. These drawings should not be construed as limiting, but are intended to be exemplary only.

DETAILED DESCRIPTION OF PREFERRED EMBODIMENTS

Figure 1:
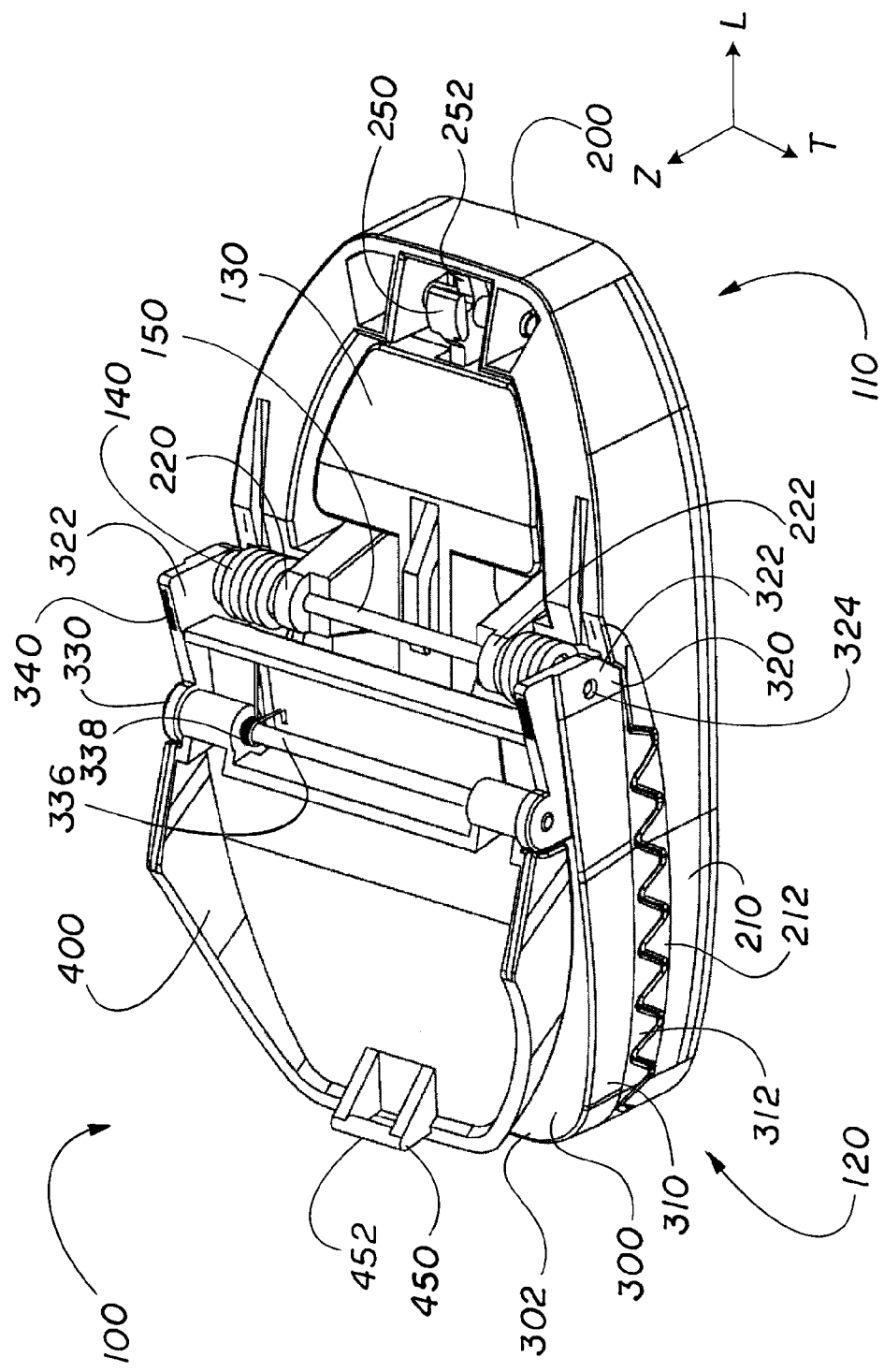
FIG. 1 is a perspective view of a trap, in accordance with an exemplary embodiment.

The following description is intended to convey a thorough understanding of the embodiments by providing a number of specific embodiments and details involving an animal trap. It is understood, however, that the invention is not limited to these specific embodiments and details, which are exemplary only. It is further understood that one possessing ordinary skill in the art, in light of known devices, systems and methods, would appreciate the use of the invention for its intended purposes and benefits in any number of alternative embodiments.

Generally speaking, the animal traps of the various exemplary embodiments described herein have a base, an upper jaw, and a collapsible set arm pivotally coupled to the upper jaw. The collapsible set arm may collapse to make the trap smaller, such as for shipping or storage purposes. The set arm may pivot from a collapsed position to an open/set position, in which the arm may be used to set the trap in a latched position.

The various exemplary embodiments generally describe devices that "trap" an animal, such as, for example, a mouse, a rat, a mole, a gopher, or other animal. In the various embodiments, the animal may simply be trapped by the device so that it cannot escape from the device. However, the embodiments are not so limited. In various embodiments, the trapped animal may be immobilized, injured or killed. For example, in various exemplary embodiments, the trapped animal may be immobilized by the device itself or by one or more of the teeth of the device. Where the trapped animal is a rodent, immobilizing the rodent may cause the rodent to develop hypothermia which may eventually kill the rodent. In yet other embodiments, the device may include a poisonous bait that may eventually kill the rodent while it is immobilized. In other embodiments, the device may injure the trapped animal, such as by crushing it, or impaling it. In other embodiments, the trapped animal may suffer a fatal injury, such as a broken neck.

While the exemplary embodiments are described specifically with reference to snapping jaw type of animal traps, it will be understood that the embodiments may be adapted to other types of animal traps. Exemplary snapping jaw traps have been described in the specifications of other patents, such as, for example: U.S. Pat. No. 2,068,492, to F. T. Johnson, entitled "Animal Trap"; U.S. Pat. No. 2,321,617, to H. J. Peterson, entitled "Mouse Trap"; U.S. Pat. No. 2,428,721, to H. J. Peterson, entitled "Animal Trap"; U.S. Pat. No. 2,611,991, to J. U. Luehn, entitled "Animal Trap"; U.S. Pat. No. 2,724,209, to S. F. Cain, entitled "Animal Trap"; U.S. Pat. No. 4,665,644, to L. Vajs et al., entitled "Mouse and Rat Trap"; U.S. Pat. No. 4,803,799, to L. Vajs et al., entitled "Mouse and Rat Trap"; U.S. Pat. No. 4,991,340, to W. Schlidt, entitled "Animal Trap"; U.S. Pat. No. 6,415,544, to R. Leyerle et al., entitled "Rodent Trap with Entrapping Teeth"; U.S. Pat. No. 6,508,031, to D. Johnson et al., entitled "Rodent Trap with Removable Bait Container"; the contents of which patents are incorporated by reference herein in their entirety.

Figure 7:
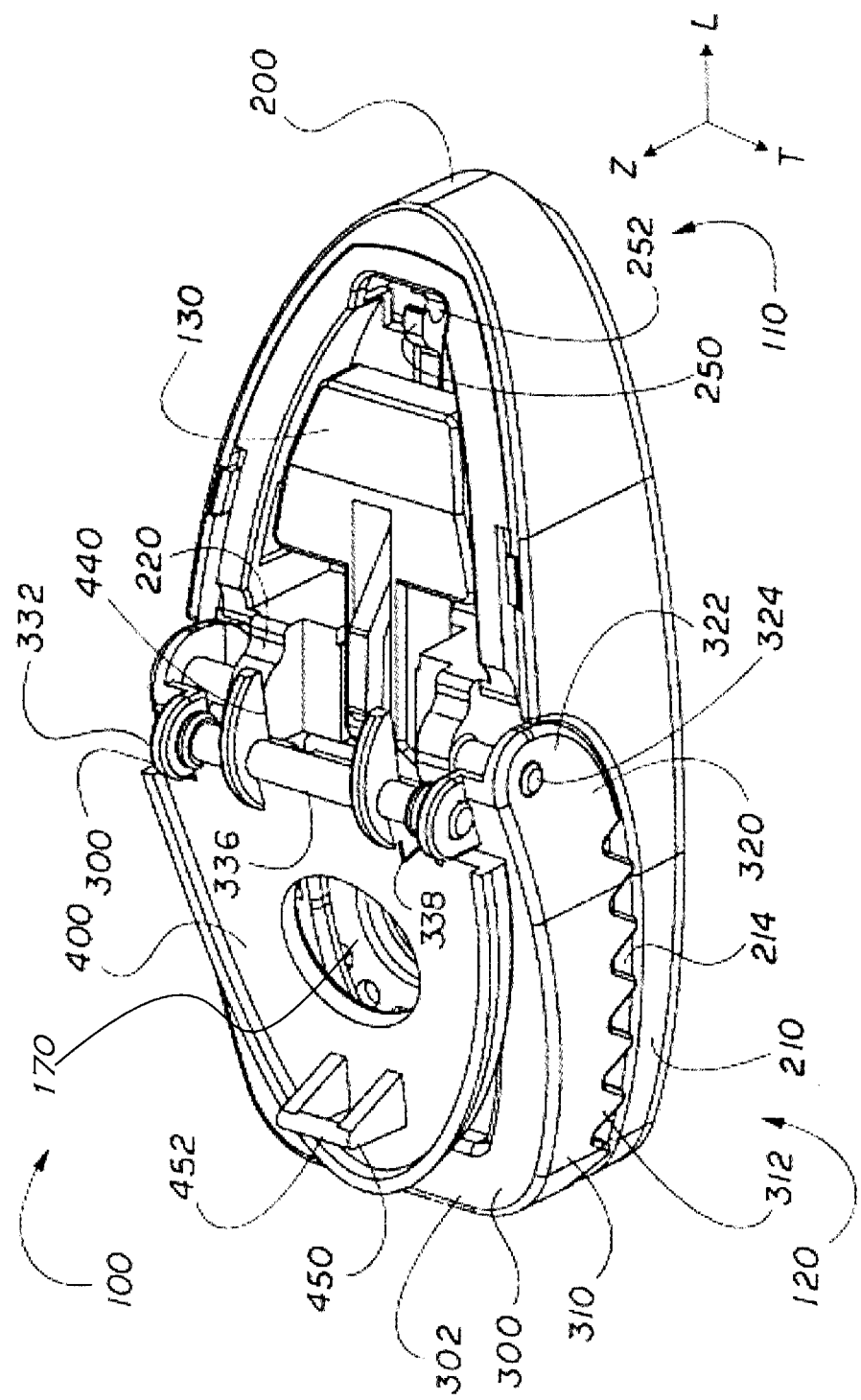
FIG. 7 is a perspective view of a trap, in accordance with an exemplary embodiment.

Referring to FIGS. 1, 2, 7, and 8, wherein like numbers refer to similar parts, in an exemplary embodiment an animal trap 100 has a base 200 to which an upper jaw 300 is pivotally coupled. The base 200 and upper jaw 300 may have any shape or size suitable for trapping an animal therebetween. Referring to FIGS. 1 and 7, in an exemplary embodiment the trap 100 may have a longitudinal direction L, a transverse direction T, and a Z-direction Z, and may have a latching portion 110, and a trapping portion 120. The latching portion 110, for example, may have one or more devices for latching, triggering, and/or releasing the trap 100. The trapping portion 120, for example, may have one or more devices for triggering the trap 100, and/or trapping an animal. In exemplary embodiments, the upper jaw 300 pivots between an open position (see FIGS. 5 and 11) and a closed position (see FIGS. 3 and 9).

In some exemplary embodiments, the base 200 may be a single unitary part. In other exemplary embodiments, the base 200 may comprise multiple parts that are joined or attached together to form the base 200. For example, referring to FIG. 15, base 200 may comprise a lower base part 200A and an upper base part 200B that are joined together to form base 200. It will be understood that the other various components of trap 100 described herein may likewise comprise either a unitary part or a plurality of parts that are joined or fastened together to form the component. The various means for designing and/or joining various parts to form one component will be understood by one familiar with such processes and parts.

Figures 12, 13:
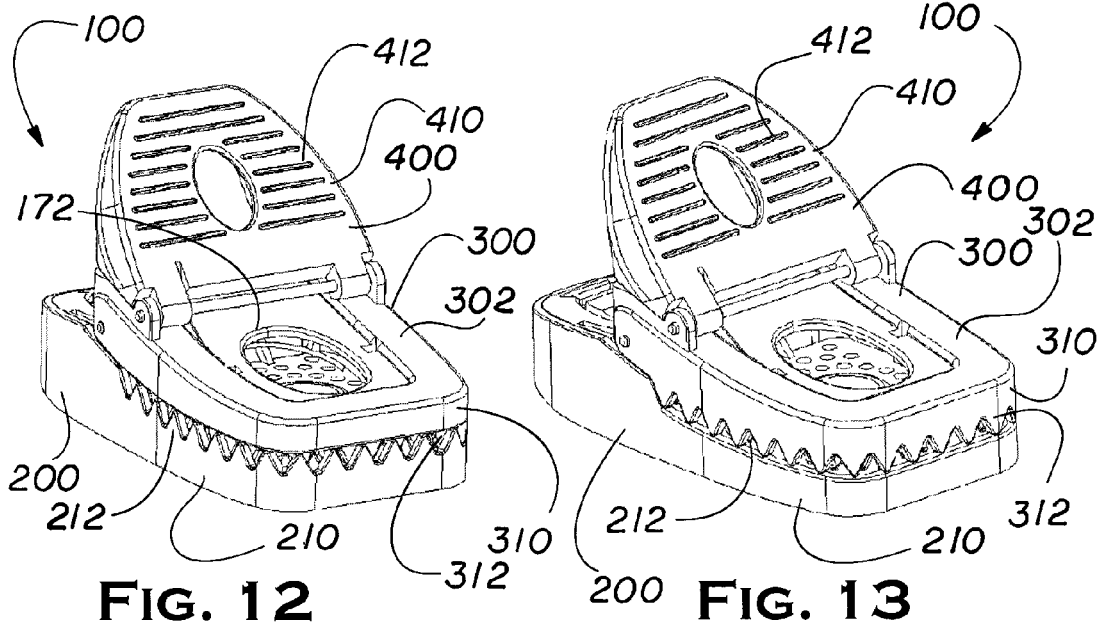
FIG. 12 is a perspective view of a trap, in accordance with an exemplary embodiment.
FIG. 13 is a perspective view of a trap, in accordance with an exemplary embodiment.
Figure 14:
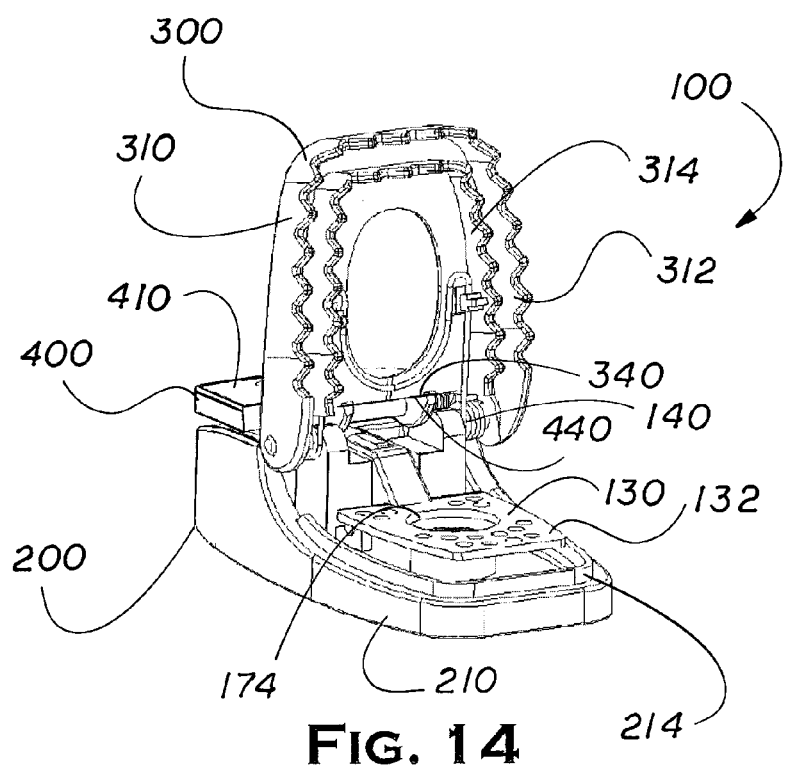
FIG. 14 is a perspective view of a trap, in accordance with an exemplary embodiment.

In an exemplary embodiment, the trapping portion 120, may include an upper gripping portion 310 on upper jaw 300, and/or a lower gripping portion 210 on the base 200. The upper gripping portion 310 and lower gripping portion 210 may have depending structures that are configured to cooperate to provide a gripping region, that grips or traps a portion of an animal, immobilizing the animal. In exemplary embodiments, the upper gripping portion 310 and/or lower gripping portion 210 may have a gripping flange and/or gripping projections or teeth, etc. and the opposed gripping portion may have a corresponding structure that receives, overlaps or engages with the respective flange, projections, teeth, etc. In some embodiments, the upper gripping portion 310 and lower gripping portion 210 may be configured to at least partially overlap to provide an "overbite," an "underbite," an interlocking configuration, or a combination thereof, when the trap 100 is in its closed position. For example, referring to FIGS. 1, 12, and 13, upper gripping portion 310 may have undulating teeth or projections 312 extending therefrom and lower gripping portion 210 may have undulating teeth or projections 212, extending therefrom, interdigitating with upper teeth 312 (as shown in FIG. 1), or overlapping with the upper teeth 312 in an underbite type configuration (as shown in FIG. 12) or an overbite type configuration (as shown in FIG. 13). Referring to FIG. 7, in another exemplary embodiment, upper gripping portion 310 may have undulating teeth or projections 312 extending therefrom, and lower gripping portion 210 may have a flange 214 that overlaps with the upper teeth 312, to provide an overbite configuration. Referring to FIG. 14, in another exemplary embodiment, upper gripping portion 310 may have a first row of teeth or projections 312, and a second row of teeth or projections 314 that overlap with a flange 214 in the lower gripping portion 210. For example, the first row of teeth or projections 312 may be in an overbite configuration with the lower flange 214, and the second row of teeth or projections may be in an underbite configuration with the lower flange 214. It will be understood that these and other similar configurations may be provided on the upper gripping portion 310 and/or lower gripping portion 210.

Figure 6:
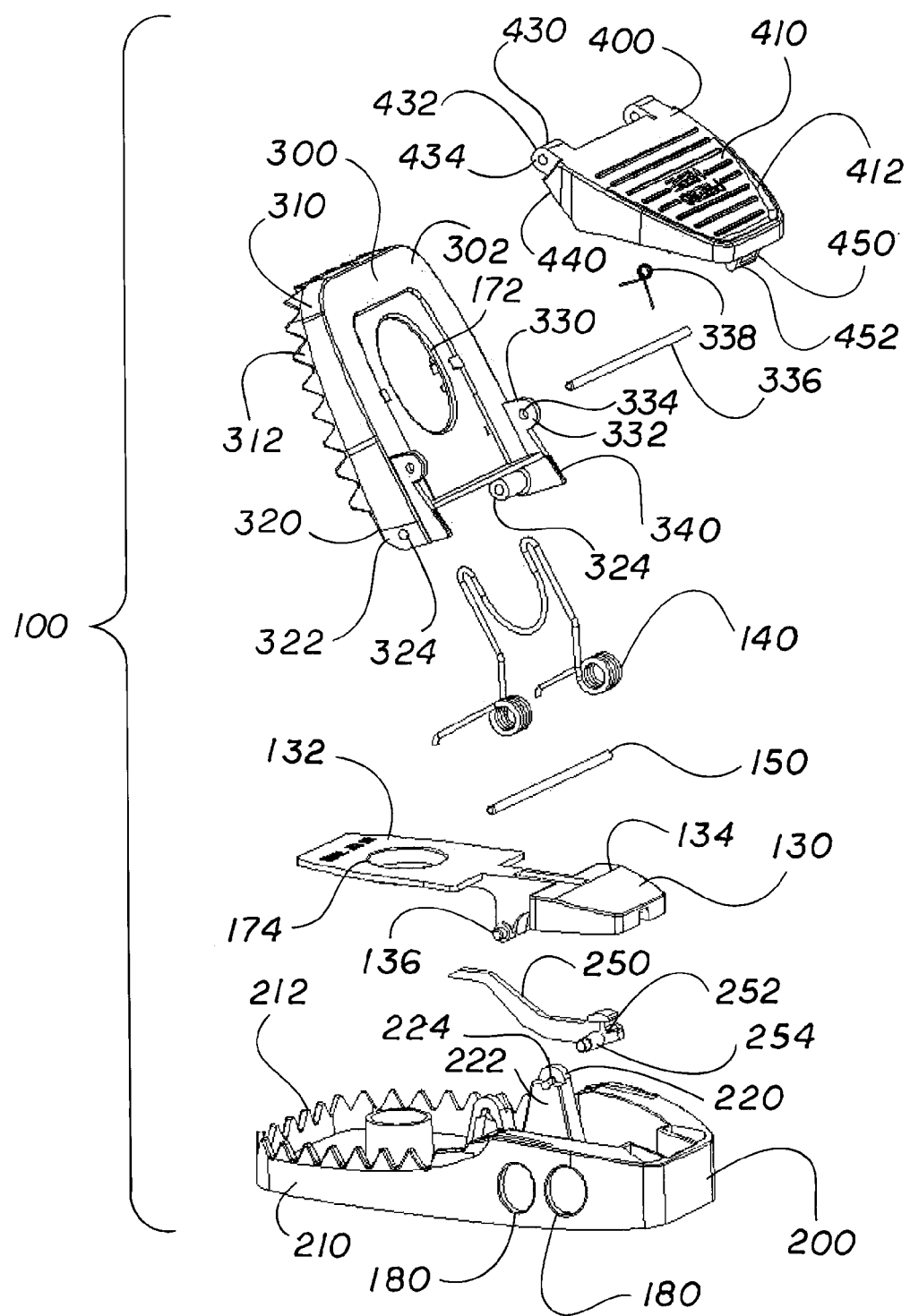
FIG. 6 is an exploded view of a trap, in accordance with an exemplary embodiment.
Figure 15:
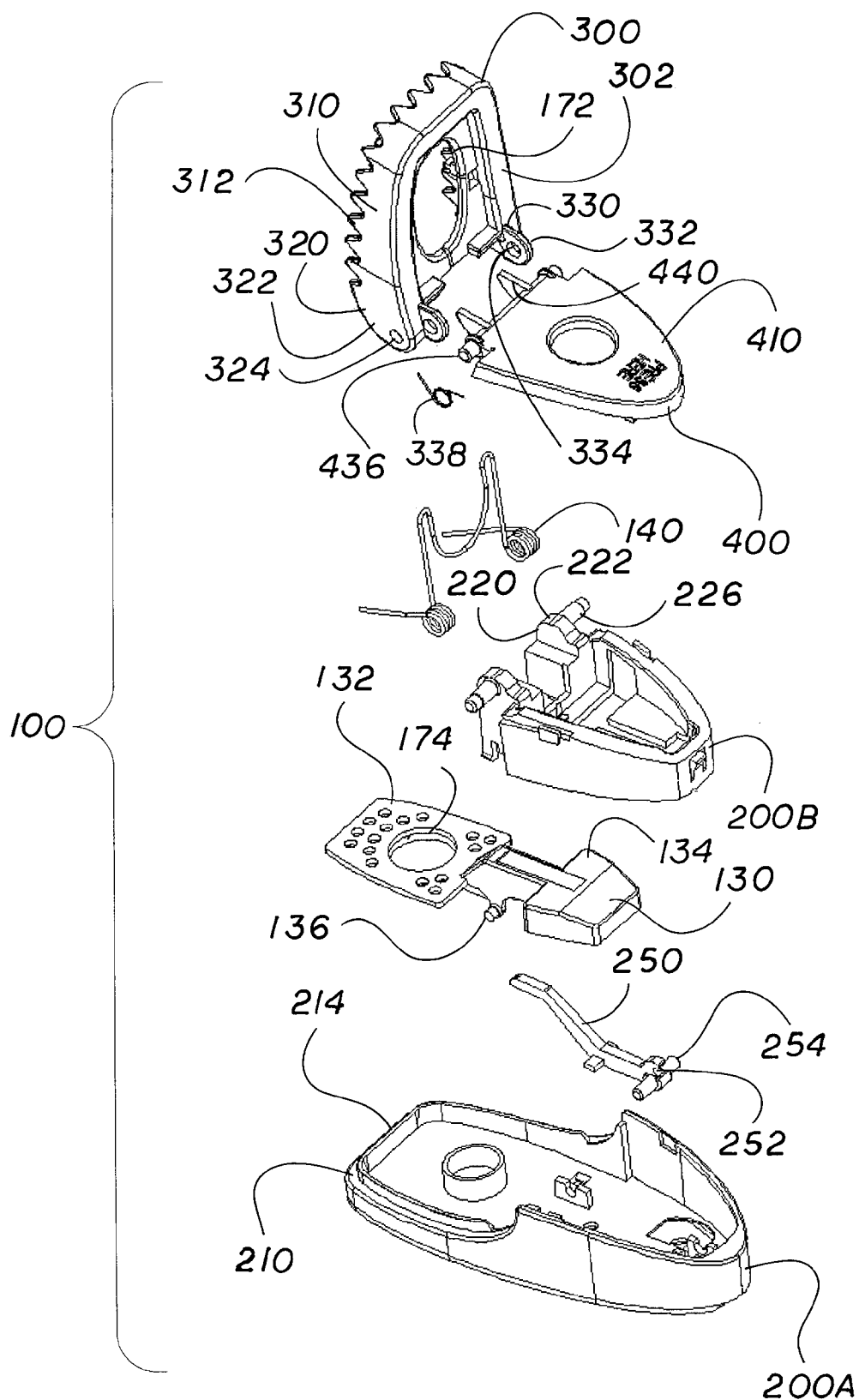
FIG. 15 is an exploded view of a trap, in accordance with an exemplary embodiment.

In an exemplary embodiment, any suitable method of pivotally mounting the upper jaw 300 to the base 200 may be used to enable the upper jaw 300 to pivot between its open position and its closed position. Referring to FIG. 6, for example, upper jaw 300 may have an upper jaw pivot portion 320 having one or more flanges 322 with shaft/boss receiving holes 324, and base 200 may have a lower jaw pivot portion 220 having one or more flanges 322 with shaft/boss receiving holes 324, where the holes 224 and 324 receive a shaft 150 that provides an axis of rotation for the upper jaw 300. Referring to FIG. 15, in another exemplary embodiment, the base 200 may have a lower jaw pivot portion 220 that has bosses or stub shafts 226 extending from one or more flanges 222, that couple with receiving holes 324 of the upper jaw pivot portion 320, providing an axis of rotation for the upper jaw 300. The bosses or stub shafts 226 may be formed integrally with the base 200, or may be separately formed and joined with the base 200. It is understood that the features described with respect to the upper jaw pivot portion 320 and lower jaw pivot portion 220 are interchangeable, e.g., the upper jaw portion 320 may have bosses or stub shafts that couple with receiving holes in the lower jaw pivot portion 220, etc. Other suitable methods and devices for pivotally mounting the upper jaw 300 to the base 200 will be understood by those familiar with the art.

Figure 2:
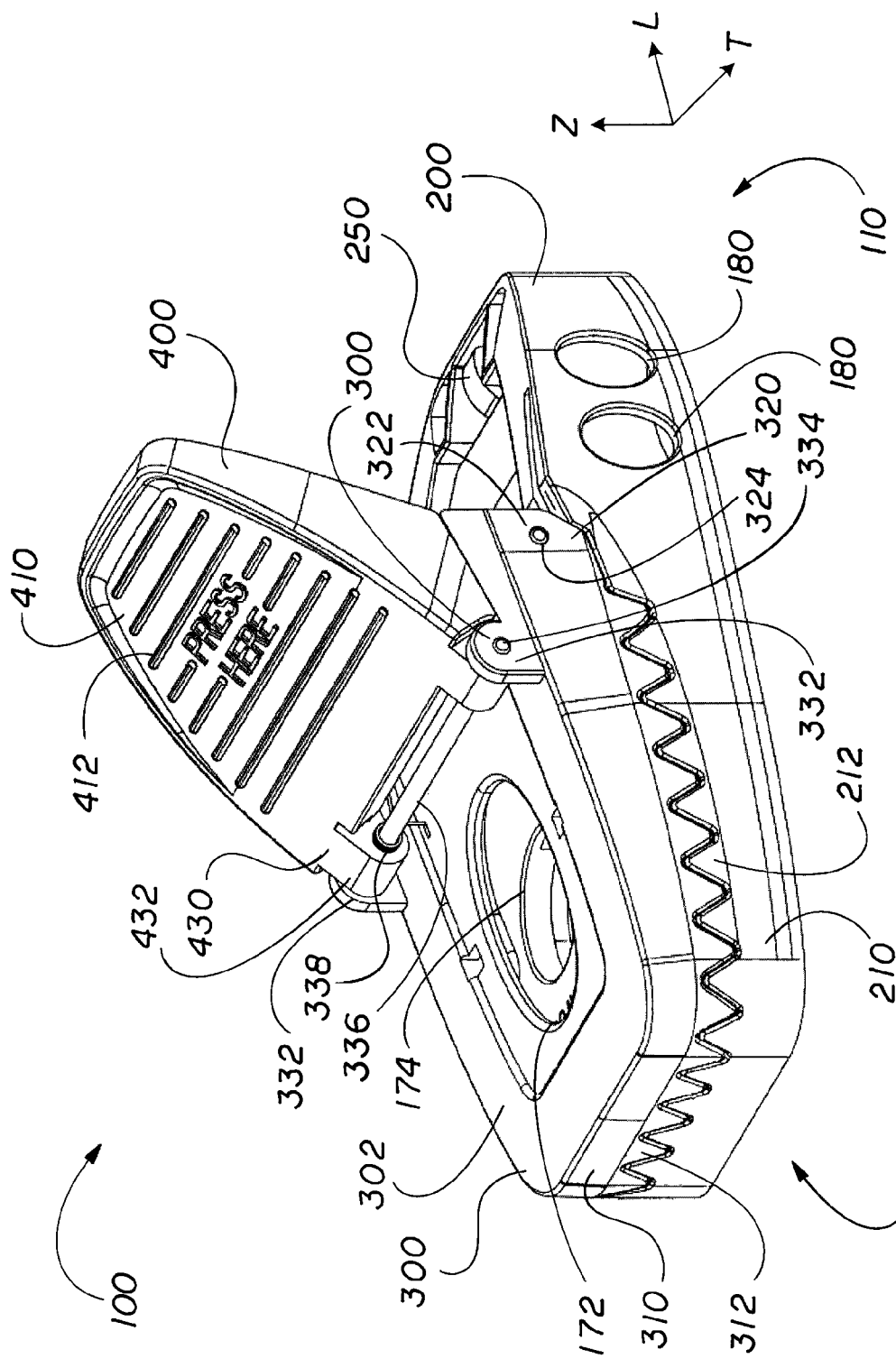
FIG. 2 is a perspective view of a trap, in accordance with an exemplary embodiment.
Figure 8:
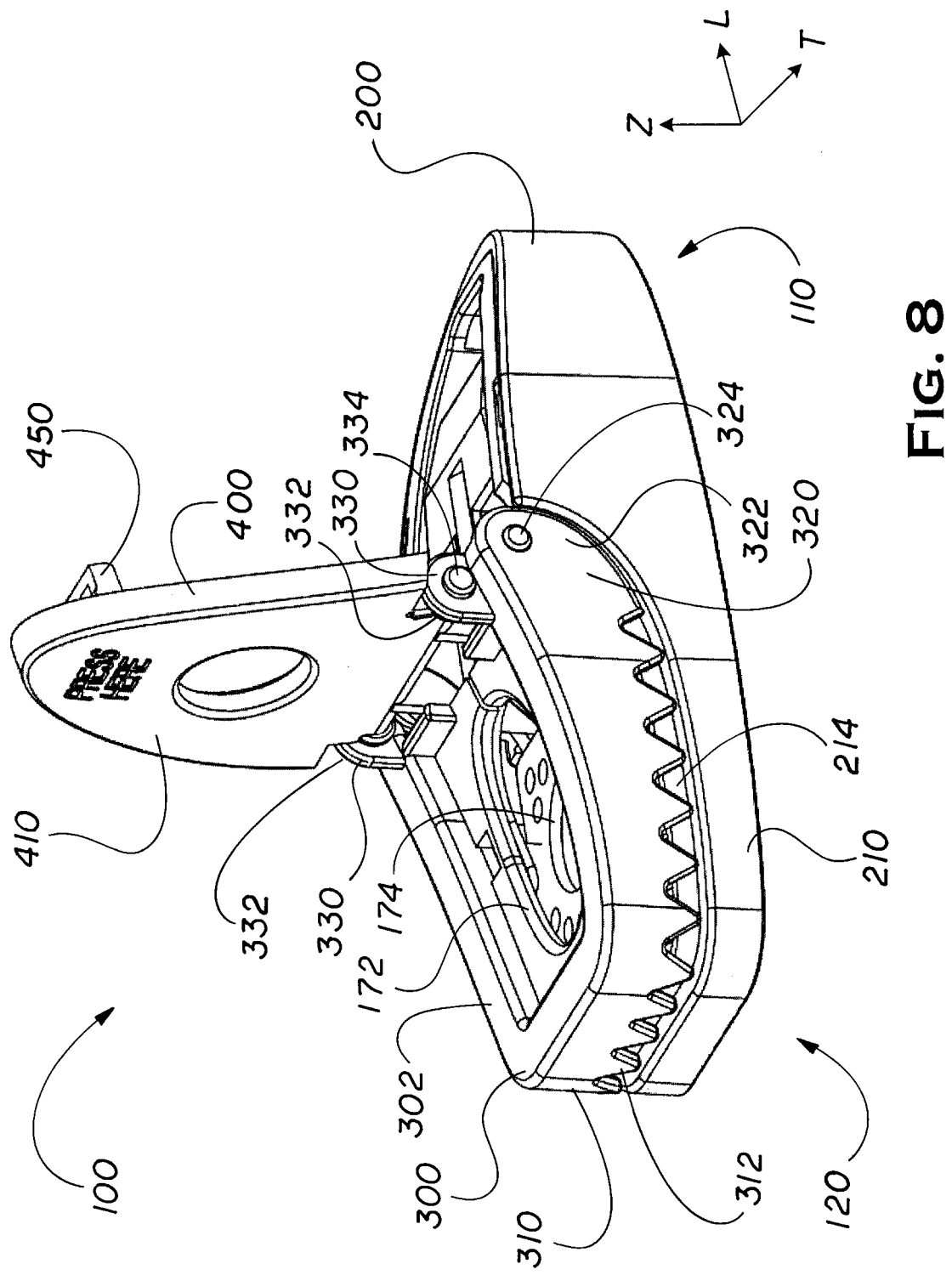
FIG. 8 is a perspective view of a trap, in accordance with an exemplary embodiment.

In some exemplary embodiments, a trap biasing mechanism 140 may be provided to bias the upper jaw 300 toward the closed position (e.g., FIGS. 2, 8). The trap biasing mechanism 140 may include any suitable device for biasing the upper jaw 300 toward a closed position such as, for example, a coil spring, a spring clip, a flexible flange, an elastic member that stretches or compresses, etc. In some embodiments, trap biasing mechanism 140, or a portion thereof, may be integral with one or more of the other parts of the trap 100. Referring to FIG. 1, in an exemplary embodiment, biasing mechanism 140 includes one or more coil springs that are disposed around the shaft 150 or pivot axis, with one portion engaged with base 200, and another portion engaged with the upper jaw 300, so that the spring coil provides biasing force on the upper jaw 300 to bias it toward the closed position. The biasing mechanism 140 may be configured to have sufficient closure force and closure action, as necessary or desired, to trap an animal between the upper jaw 300 and the base 200. For example, in an exemplary embodiment, the biasing mechanism 140 may be configured to provide a fast snapping action and a tight grip, so that when the trap 100 is triggered, the trap 100 closes quickly and securely to prevent an animal's escape.

In an exemplary embodiment, trap 100 may have a set arm 400. The set arm 400 may act as a lever for opening the upper jaw 300, such as to set the trap 100. The set arm 400 may have a setting/bearing surface 410, upon which force may be applied by a user, and may have at least one surface that engages (directly or indirectly) with the upper jaw 300 to transfer this applied force to the upper jaw 300. In various exemplary embodiments, the setting/bearing surface 410 may have any suitable size and/or shape to provide a suitable load bearing surface appropriate to move the upper jaw 300 from a closed (unlatched) position to an open (latched) position. The trap 100 may be configured to be opened by hand, by foot, and/or by another opening mechanism. In some exemplary embodiments the setting/bearing surface 410 may be a substantially continuous surface, or it may have one or more openings or holes in the surface. In some exemplary embodiments, the setting/bearing surface may have one or more gripping elements 412, such as contours, protrusions, ridges, depressions, etc., that are configured to improve the setting/bearing surface 410, such as to improve the frictional engagement of between the user and the surface 410. Other suitable methods and devices for improving frictional engagement will be understood by those familiar with the art. In some exemplary embodiments, the set arm 400 may have reinforcing structures, such as ribs, flanges, etc., to provide necessary and/or desired structural support, such as, for example, to provide sufficient strength so that the set arm 400 can withstand forces applied to the set arm 400 when the trap is being set. The reinforcing structures may be formed integrally with the set arm 400, or may be separately formed, and joined with the set arm 400. Suitable methods and devices for reinforcing the set arm 400 will be understood by those familiar with the art.

In an exemplary embodiment, set arm 400 may be pivotally coupled with upper jaw 300 so that the set arm 400 may pivot between a collapsed position (see FIGS. 1, 7) and an open position (see FIGS. 2, 8), in which the set arm may be used to set the trap 100. In exemplary embodiments, the pivot axis of the set arm 400 is substantially parallel to the pivot axis of the upper jaw 300. In some embodiments, the pivot axis of the set arm 400 may be coaxial with the pivot axis of the upper jaw 300. Any suitable method of pivotally mounting the set arm 400 to the upper jaw 300 may be used. Referring to FIG. 6, in an exemplary embodiment, set arm 400 may have a set arm pivot portion 430, including one or more flanges 432 with shaft/boss receiving holes 434, and upper jaw 300 may have a set arm pivot portion 330 including one or more flanges 332 with shaft/boss receiving holes 334. Shaft 336 may be received in shaft/boss receiving holes 334, 434 to provide a pivot axis for the set arm 400. In another embodiment, instead of a shaft, the upper jaw 300 and/or the set arm 400 may have bosses or stub shafts that couple with corresponding receiving holes 334 or 434, to provide a pivot axis for the set arm 400. For example, referring to FIG. 15, set arm 400 may have a set arm pivot portion 430, including one or more flanges 432 with stub shafts or bosses 436, that may be received in shaft/boss receiving holes 334 of the upper jaw 300. The bosses or stub shafts 436 may be formed integrally with the set arm 400, or may be separately formed and joined with the set arm 400. It is understood that the features described with respect to the pivot portion 430 of the set arm 400 and pivot portion 330 of the upper jaw 300 are interchangeable, e.g., the upper jaw pivot portion 330 may have bosses or stub shafts that couple with receiving holes in the set arm pivot portion 430, etc. Other suitable methods and devices for pivotally mounting the set arm 400 to the upper jaw 300 will be understood by those familiar with the art.

Referring to FIGS. 1, 3, 7, and 9, in the collapsed position the set arm 400 may be pivoted toward the upper jaw 300, so that the setting/bearing surface 410 is adjacent the upper surface 302 of the upper jaw 300. Referring to FIGS. 2, 4, 8, and 10, the set arm 400 may be pivoted to the open position, in which the setting/bearing surface 410 is further away from the upper surface 302 of the upper jaw 300. Referring to FIGS. 4 and 10, the set arm 400 may have an open angle α, as measured between the collapsed position of the setting/bearing surface 410, and the open position of setting/bearing surface 410. In some embodiments, once the set arm 400 pivots to the open angle α, it does not pivot beyond the open angle α, but it can pivot back towards the collapsed position. In exemplary embodiments, the open angle α may be between about 0 and about 180 degrees. The open angle α may be predetermined for a particular trap 100. For example, if the trap 100 is large, and/or the jaw biasing mechanism 140 requires a significant amount of force to open the upper jaw 300, then the open angle α may be greater (e.g., greater than about 90 degrees), so that the trap 100 may be set by a user's foot. In comparison, if the trap is smaller, and/or the jaw biasing mechanism 140 can be overcome by hand, then the open angle α may be smaller (e.g., about 90 degrees), so that the trap 100 may be set by a user's hand. In various exemplary embodiments, the open angle α of the trap may be between about 10 and about 170 degrees, or between about 45 and about 160 degrees, or between about 90 degrees and about 110 degrees.

Figure 3:
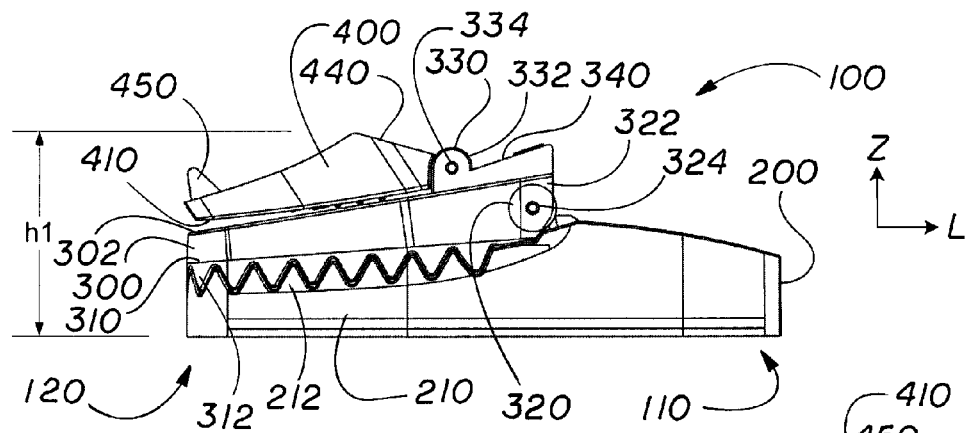
FIG. 3 is a side view of a trap in a first position, in accordance with an exemplary embodiment.
Figure 4:
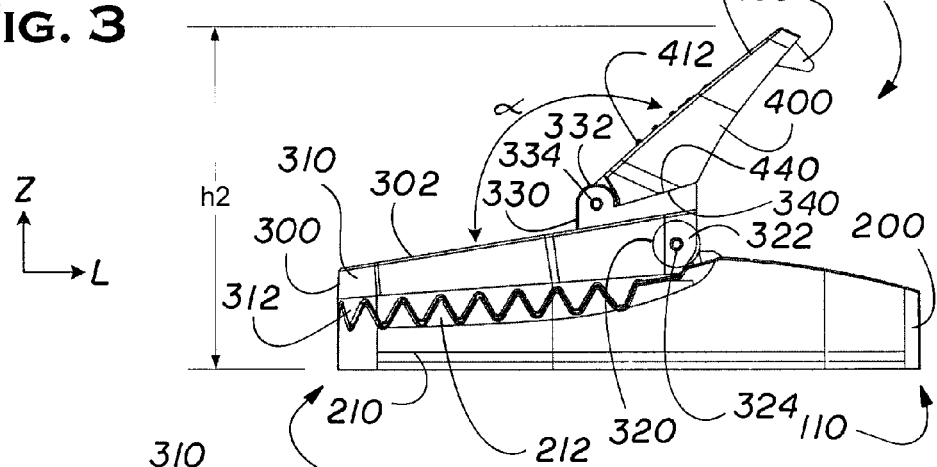
FIG. 4 is a side view of a trap in a second position, in accordance with an exemplary embodiment.
Figure 9:
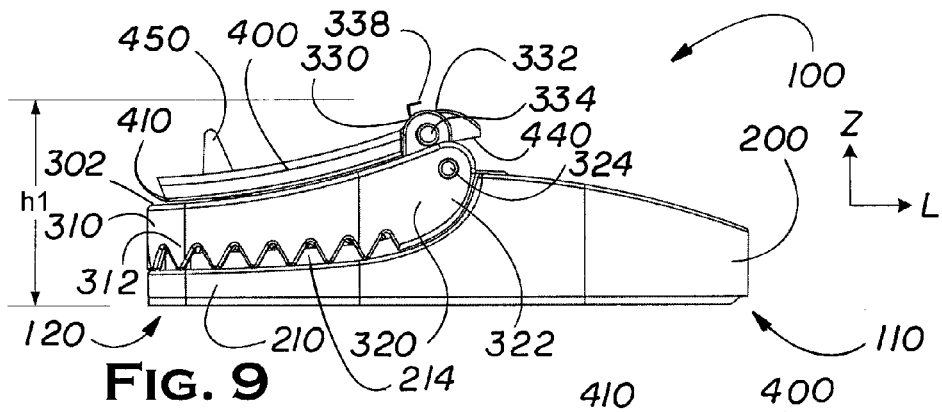
FIG. 9 is a side view of a trap in a first position, in accordance with an exemplary embodiment.
Figure 10:
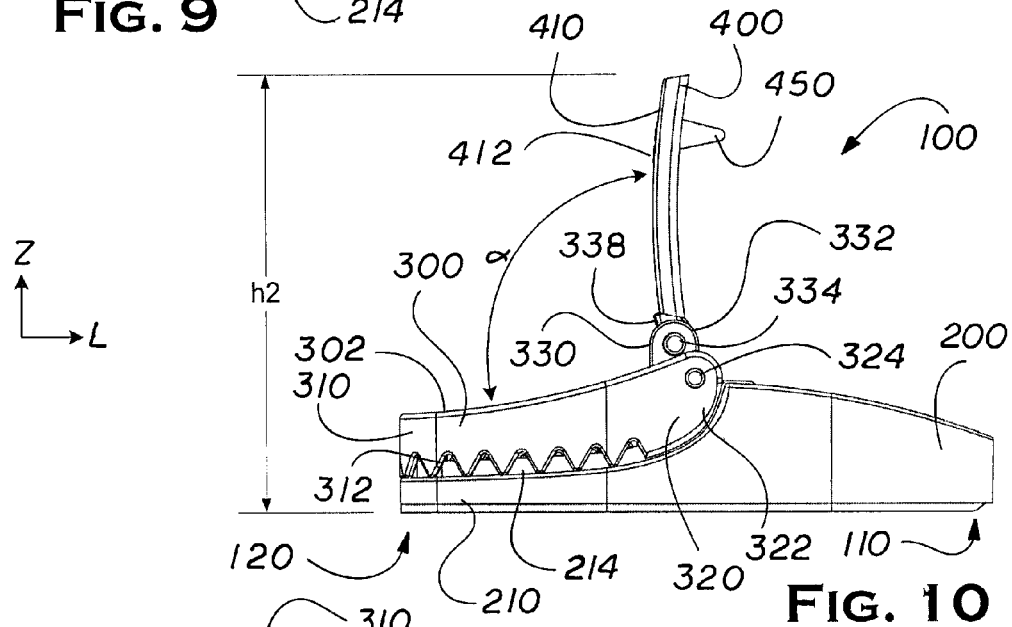
FIG. 10 is a side view of a trap in a second position, in accordance with an exemplary embodiment.

Referring to FIGS. 3 and 9, when the set arm 400 is in its collapsed position (and the trap 100 is in its unlatched/closed position), the trap 100 has a first, collapsed height h1, measured as the largest dimension in the Z-direction. Referring to FIGS. 4 and 10, trap 100 has a second, opened height h2, when the set arm 400 is in its opened position (again, measured as the largest dimension in the Z-direction). In exemplary embodiments, the first, collapsed height h1 is smaller than the second, opened height h2.

In various exemplary embodiments, a set arm biasing mechanism 338 may optionally be provided to bias the set arm 400 to its open position. For example, the trap 100 may be packaged in a carton in its collapsed position, and when the trap 100 is removed from the carton, the set arm 400, under the force of the set arm biasing mechanism 338, pivots from its collapsed position to its open position. The set arm biasing mechanism 338 may include any suitable device for biasing the set arm 400 an open position such as, for example, a coil spring, a spring clip, a flexible flange, an elastic member that stretches or compresses, etc. In some embodiments, the set arm biasing mechanism 338 may be integral with one or more of the other parts of the trap 100. Referring to FIGS. 1 and 7, in an exemplary embodiment, set arm biasing mechanism 338 may include one or more coil springs that are disposed around the shaft 336 or pivot axis, with one portion engaged with set arm 400, and another portion engaged with the upper jaw 300, so that the spring coil provides biasing force on the set arm 300 to bias it toward its open position. The biasing mechanism 338 may be configured to have suitable force and action as necessary or desired, such as to pivot the set arm 400 toward its open position when no force is applied to it, and/or provide suitable resistance to a collapsing force.

In some exemplary embodiments, the set arm 400 may be temporarily held in its collapsed position by an external restraint. For example, in some embodiments, the set arm 400 may be held in its collapsed position by a strap, adhesive tape, a band, or other suitable restraining means. In some embodiments, the trap 100 may be inserted into a package with the set arm 400 in its collapsed position, and the package holds the set arm 400 in its collapsed position while the trap 100 is in the package. In some exemplary embodiments, the set arm 400 may be temporarily held in its collapsed position by a restraint that is integral with the trap 100. For example, the trap 100 may have a restraining device such as an integrated clip, latch, snap fit mechanism, detent, or other suitable restraining device. In the exemplary embodiments, a user may release the restraint to allow the set arm 400 to move from its collapsed position to its open position.

In some exemplary embodiments, the set arm 400 may be held in its open position, at least temporarily, by a restraining device. In some exemplary embodiments, the set arm 400 may be temporarily held in its open position by a restraint that is integral with the trap 100. For example, the trap 100 may have a restraining device such as an integrated clip, latch, snap fit mechanism, detent, or other suitable restraining device. The restraining device may be automatically set, such as when the set arm 400 reaches its opened position, or it may be manually set, such as by a user. In the exemplary embodiments, a user may release the restraint to allow the set arm 400 to enable it to move between its closed position and its opened position.

In exemplary embodiments, the set arm 400 and/or the upper jaw 300 may have one or more structures that provide a pivot stop, that stops the set arm 400 from pivoting further when it rotates to the open position (e.g., at open angle α). Any suitable stop mechanism may be used to stop the pivotal motion of the set arm 400 with respect to the upper jaw 300, such as, for example, engaging surfaces, flanges, notches, grooves, etc. For example, referring to FIGS. 3 and 4, set arm 400 has a stop surface 440 that stops against a corresponding stop surface 340 on the upper jaw 300 when the set arm is in its open position. The stop surfaces 340, 440 may be integrally formed in one or more surfaces of the upper jaw 300 or set arm 400, respectively, or may be on a separate surface, such as a lip or flange, that is joined with the upper jaw 300 and/or set arm 400. For example, referring to FIG. 15, stop surface 440 of set arm 400 may comprise a flange that protrudes from the main portion of the set arm 400, and is configured to engage with a corresponding surface on the upper jaw 300. The corresponding stop surfaces 340, 440 are aligned so that when the stop arm 400 pivots to its open position, the stop surfaces 340, 440 will engage with each other to stop the pivoting motion of the set arm 400. One or more of the stop surfaces 340, 440 may have alignment devices such as engaging projections or grooves, to assist with the alignment of the stop surfaces 340, 440, and/or prevent them from prematurely disengaging. In some embodiments, when pivot stop surfaces 340, 440 are engaged, the set arm 400 does not rotate beyond the open position. In some embodiments, a plurality of stops may be provided in series, so that the set arm 400 may pivot to a first open position, and then be released from the first open position and pivot to a second open position, etc.

In various exemplary embodiments, the set arm 400 is operably coupled with the upper jaw 300, so that when the set arm 400 is in its open position, a user may apply a setting/latching force to the setting/bearing surface 410 that will move the trap 100 to a latched position, ready to be triggered. For example, the engaged pivot stop surfaces 340, 440, may be used to transfer force between set arm 400 to the upper jaw 300. In various exemplary embodiments, when a setting force is applied to the setting/bearing surface 410 of set arm 400, a corresponding force is transferred to the upper jaw 300 via the engaged pivot stop surfaces 340, 440. In other words, the pivotal force exerted on pivot stop surface 440 is translated to a corresponding force on pivot stop surface 340, on the upper jaw 300 causing the upper jaw 300 to pivot about its pivot axis. The force on the pivot stop surface 340 may cause the upper jaw 300 to pivot about the shaft/pivot axis 150, such as from its closed position to its open (latched) position.

In an exemplary embodiment trap 100 has one or more latching mechanisms that, when latched, hold the trap 100 in a latched position. The latching mechanisms may be coupled with corresponding portions of the set arm 400 and the base 200, or the upper jaw 300 and base 200. For example, referring to FIGS. 1 and 7, the set arm 400 may have a first latching mechanism 450 that is configured to engage with a base latching mechanism 250, when the set arm 400 is pivoted to its latched position. In an exemplary embodiment, the first latching mechanism 450 may comprise a projection or notch 452 that is configured to engage with a corresponding detent or groove 252 in the base latching mechanism 250. In exemplary embodiments, the latching mechanisms 250 and/or 450 may be moveable between a latched position, in which the latching mechanisms 250, 450 are engaged, and a triggered (unlatched) position, in which the latching mechanisms 250, 450 are disengaged. For example, referring to FIGS. 6 and 15, the base latching mechanism 250 may be pivotally coupled with the base at latch pivot axis 254. At one end of the base latching mechanism 250 is detent 252. When the base latching mechanism 250 is pivoted to its latched position, the projection 452 of the set arm 400 may be engaged with the detent 252, and held in place. When the base latching mechanism 250 pivots to its unlatched position, the projection 452 is released from the detent 252, thereby releasing set arm 400 and upper jaw 300. As described in more detail below, the trap 100 may be configured so that the trigger mechanism 130 pivots the base latching mechanism 250 from its latched position to its unlatched position. Other suitable methods and devices for latching the set arm 400 or upper jaw 300 with the base 200 will be understood by those familiar with the art.

Figure 5:
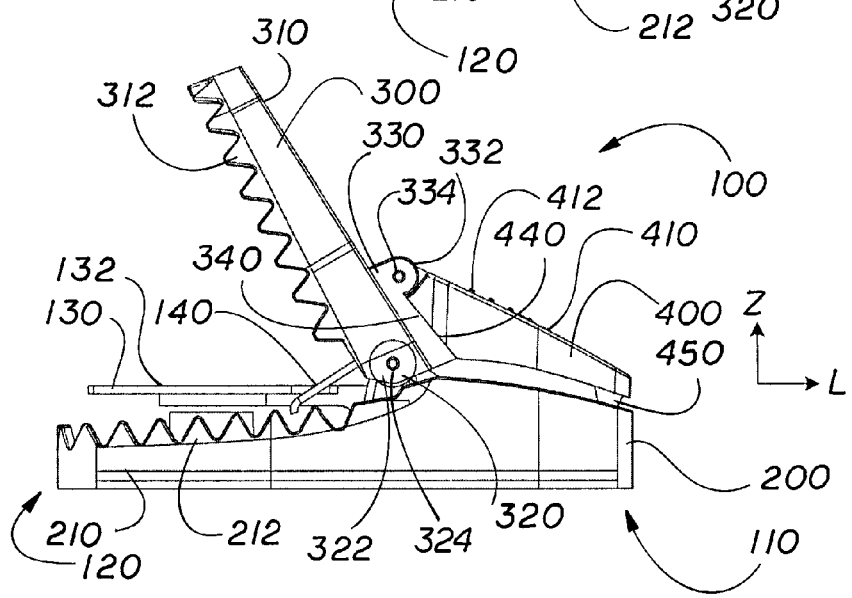
FIG. 5 is a side view of a trap in a third position, in accordance with an exemplary embodiment.
Figure 11:
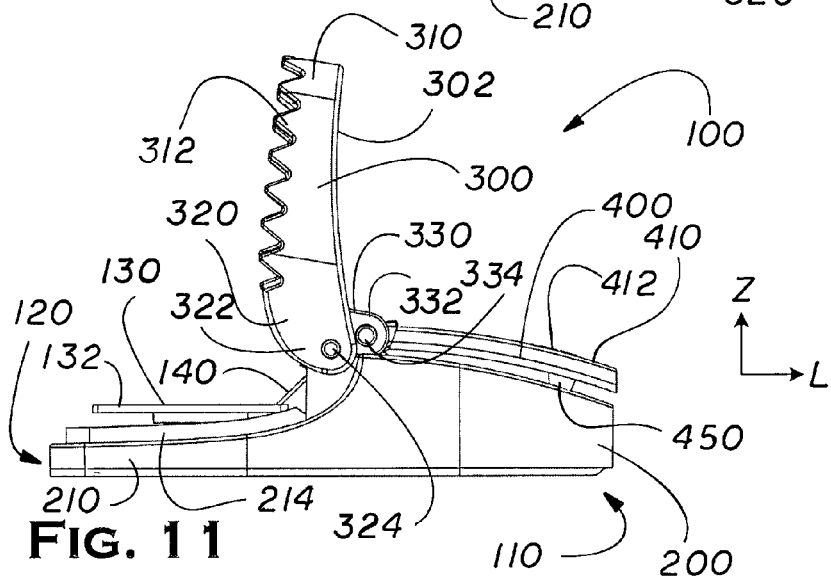
FIG. 11 is a side view of a trap in a third position, in accordance with an exemplary embodiment.

In an exemplary embodiment, trap 100 has one or more trigger mechanisms 130 that, when triggered by an animal, release the latching mechanism 250, which releases the trap 100 to pivot to its closed position such as under the force of the jaw biasing mechanism 140. Referring to FIGS. 6 and 15, in exemplary embodiments, trigger 130 may have a trigger portion 132 and a latch release portion 134. Referring to FIGS. 5, 11, and 14, the trigger portion 132 may be exposed to an animal when the trap 100 is in its set position. The trigger 130 may be configured so that when an animal contacts the trigger portion 132, it causes the latch release portion 134 to engage with the latching mechanism 250 and/or 450, to move the trap to an unlatched position. For example, referring to FIGS. 6 and 15, a trigger 130 may be pivotally coupled with the base 200 at pivot axis 136, so that trigger portion 132 and latch release portion 134 are on opposite sides of the pivot axis 136. When an animal depresses the trigger portion 132, the latch release portion 134 pivots about the pivot axis 136, releasing the base latching mechanism 250 (causing detent 252 and projection 452 to disengage). As a result, upper jaw 300, under the force of the jaw biasing mechanism 140, snaps toward its closed position. It will be understood that any suitable triggering mechanism may be used in the exemplary trap 100. Suitable triggering mechanisms include, for example, the triggering mechanisms described in one or more of the following, the disclosures of which are incorporated by reference in their entirety: U.S. Pub. No. 2009/0151223, "Rodent trap having a pivoting platform," (U.S. application Ser. No. 11/956,929); U.S. Pub. No. 2009/0151224, "Rodent trap having a pivoting platform," (U.S. application Ser. No. 12/139,849); U.S. Pub. No. 2009/0151225, entitled "Rodent trap having a snare," (U.S. application Ser. No. 12/956,963); U.S. Pub. No., entitled "Rodent Trap Having Compressive Trapping Members," (U.S. application Ser. No. 11/956,912).

In various embodiments, the trap 100 may have other features as necessary or desired. For example, referring to FIG. 7, in exemplary embodiments, trap 100 may include a bait or attractant system, to attract animals to the trap. An exemplary bait system may include a bait or attractant well 170, that may house or contain the bait or attractant. The trap 100 may be pre-baited, e.g., the bait well 170 may be filled at the time the trap is manufactured; or the trap 100 may be baited by the end user, e.g., the end user may fill the bait well 170 with a bait or attractant before or after the trap 100 is set. As shown in FIGS. 2 and 8, the upper jaw 300 may have a bait port 172 and/or the trigger 130 may have a bait port 174 through which the bait well 170 may be accessed when the trap 100 is in a closed position. In another embodiment, the trap 100 may have a device, such as one or more openings, loops, or holes 180 (see FIGS. 2 and 6), which may be used to secure or anchor the trap 100 to another structure.

In various embodiments, a method of trapping an animal may be provided. In exemplary methods, a trap 100 may be provided in a first position (e.g., FIGS. 3 and 9). The trap 100 may have any of the features described or incorporated by reference herein. For example, the trap 100 may have a base 200, an upper jaw 300 pivotally coupled to the base 200, and a set arm 400 pivotally coupled to the upper jaw 300. In the first position, the upper jaw 300 is in a closed position relative to the base 200, and the set arm 400 is in a collapsed position relative to the upper jaw 300. In the first position, the trap 100 has a first height h1, measured as the largest dimension in a Z-direction of the trap.

According to various embodiments, the method may include moving the trap 100 from the first position to a second position (e.g., FIGS. 4 and 10), by moving set arm 400 to an opened position relative to the upper jaw 300. For example, the set arm 400 may be manually opened, such as by a user; or a set arm biasing mechanism 338 may be provided between the set arm 400 and the upper jaw 300, that moves the set arm 400 to the open position when no restraining force holds the set arm 400 in the collapsed position. In the second position, the upper jaw 300 is in the closed position relative to the base 200. In the second position, the trap 100 has a second height h2, measured as the largest dimension in a Z-direction of the trap. The second height h2 is greater than the first height h1 of the trap 100.

According to various embodiments, the method may further include moving the trap from the second position to a third position (e.g., FIGS. 5 and 11), in which the set arm 400 is moved to a latched position, and the upper jaw 300 is moved to an open position relative to the base. For example, a user may apply a force on the setting/bearing surface 410 of the set arm 400, whereby the set arm 400 provides a lever that opens the upper jaw 300. In the third position, a latching mechanism 450 on the set arm 400 may be engaged with a corresponding latching mechanism 250 on the base 200, to maintain the trap in the third position. In the third position, a trigger 130 is exposed to an animal, and is operably coupled with the latching mechanism 250.

According to various embodiments, the method may further include the step of triggering the trap 100, which releases the trap 100 from the third position so that it may move toward the second position. In this step, the animal to be trapped activates the exposed trigger 130. In response, the trigger releases the latching mechanism 250 from latching mechanism 450, which releases the upper jaw 300. The upper jaw 300, under the force of a jaw biasing mechanism 140, closes toward the base 200. In an exemplary embodiment, the animal that triggers the trap 100 may become trapped and/or immobilized between the upper jaw 300 and the base 200.

In some exemplary embodiments, the trap 100 may be configured to be reusable, i.e., once it has trapped an animal, it may be reset so that it may be used to trap another animal. In some exemplary embodiments, the trap 100 may be configured for a single use. Accordingly, in one exemplary embodiment, the trap 100 and its component parts are made of a relatively inexpensive material, such as a thin-walled rigid polymeric material that may be injection molded in to the necessary or desired shapes. For example, the trap 100, and any of its component parts, may preferably be made of a polymeric material, such as rigid styrene polymers and co-polymers. Other suitable materials include acrylonitrile-butadiene-styrene (ABS), or polyvinyl-chloride (PVC). It is appreciated that other suitable polymeric materials and/or suitable non-polymeric materials, may be selected for the construction of the trap 100 or its component parts.

In certain exemplary embodiments, each of the components described herein may be injection molded to a desired shape. In some exemplary embodiments, each component part may be molded as a single unitary molded part. In other exemplary embodiments, the component may be molded in multiple parts that are joined or attached together to form the component. The various means for designing molds, and joining various parts to form one component will be understood by one familiar with such processes and parts.

In the preceding specification, various embodiments have been described with reference to the accompanying drawings. It will, however be evident that various modifications and changes may be made thereto, and additional embodiments may be implemented, without departing from the broader scope of the exemplary embodiments as set forth in the claims that follow. The specification and drawings are accordingly to be regarded in an illustrative rather than a restrictive sense.

What is claimed is:

1. An animal trap comprising:
   a base;
   an upper jaw pivotally coupled with the base so that said upper jaw is moveable between an open position and a closed position; and
   a set arm pivotally coupled with the upper jaw so that said set arm is moveable between a collapsed position and an open position, whereby an open angle between the collapsed position and the open position is from about 10 degrees to about 170 degrees;
   wherein the set arm in its open position provides a lever whereby application of a force to the set arm moves the upper jaw toward its open position; and
   a latching mechanism comprising a first latch member that fixedly extends from an underside of the set arm and a corresponding second latch member structurally connected to the base, such that the first and second latch members engage when the latching mechanism is in its latched position.

2. The animal trap of claim 1, wherein the upper jaw has a downward depending upper gripping mechanism comprising a flange, a projection, a tooth, or a combination thereof.

3. The animal trap of claim 2, wherein the base has an upward depending lower gripping mechanism comprising a flange, a projection, a tooth, or a combination thereof.

4. The animal trap of claim 3, whereby when the upper jaw is in its closed position, the upper gripping mechanism overlaps with the lower gripping mechanism in an overbite configuration, an underbite configuration, or a combination thereof.

5. The animal trap of claim 1, wherein the upper jaw pivots about a first pivot axis, and the set arm pivots about a second pivot axis that is substantially parallel to the first pivot axis.

6. An animal trap comprising:
   a base;
   an upper jaw pivotally connected with the base, that is moveable between a closed position and an open position;
   a set arm pivotally connected with the upper jaw, that is moveable between a collapsed position, an open position in which the set arm provides a lever whereby application of a force to the set arm moves the upper jaw toward its open position, and a set arm latched position; and
   a latching mechanism that has a latched position and an unlatched position wherein the latching mechanism comprises a first latch member that fixedly extends from an underside of the set arm and a corresponding second latch member structurally connected to the base, such that the first and second latch members engage when the latching mechanism is in its latched position;
   wherein the trap has:
      a first position in which the upper jaw is in the closed position, the set arm is in the collapsed position, and the latching mechanism is in the unlatched position;
      a second position in which the upper jaw is in the closed position, the set arm is in the open position, and the latching mechanism is in the unlatched position; and
      a third position in which the upper jaw is in the open position, the set arm is in the set arm latched position, and the latching mechanism is in the latched position.

7. The animal trap of claim 6, whereby in the first position, the set arm has a surface that is directly adjacent the upper jaw.

8. The animal trap of claim 6, comprising a first height h1 measured as the greatest dimension in a Z-direction of the trap in its first position; and a second height h2 measured as the greatest dimension in the Z-direction of the trap in its second position; wherein h1 is less than h2.

9. The animal trap of claim 6, comprising a set arm biasing mechanism that biases the set arm toward its open position.

10. The animal trap of claim 6, comprising an upper jaw biasing mechanism that biases the upper jaw toward its closed position.

11. The animal trap of claim 6, wherein the first latch member comprises a flange having a notch or post, and the second latch member comprises a detent configured to receive at least a portion of the first latch member.

12. The animal trap of claim 6, comprising a trigger operably coupled with the latching mechanism, whereby when the trigger is activated, the latching mechanism moves from the latched position to the unlatched position.

13. A method of trapping an animal comprising:
   providing a trap having:
      a base,
      an upper jaw pivotally connected with the base, that is moveable between a closed position and an open position,
      a set arm pivotally connected with the upper jaw, that is moveable between a collapsed position, an open position, and a set arm latched position, and
      a latching mechanism that has a latched position and an unlatched position wherein the latching mechanism comprises a first latch member that fixedly extends from an underside of the set arm and a corresponding second latch member structurally connected to the base, such that the first and second latch members engage when the latching mechanism is in its latched position; and
   moving the trap between a first position, wherein the upper jaw is in the closed position, the set arm is in the collapsed position, and the latching mechanism is in the unlatched position, and a second position, wherein the upper jaw is in the closed position, the set arm is in the open position, and the latching mechanism is in the unlatched position; and
   moving the trap between the second position and a third position in which the upper jaw is in the open position, the set arm is in the set arm latched position, and the latching mechanism is in the latched position.

14. The method of claim 13, wherein the step of moving the trap between the first position and the second position comprises providing a set arm biasing mechanism that provides a biasing force that biases the set arm toward the open position.

15. The method of claim 13, wherein the step of moving the trap between the first position and the second position comprises manually moving the set arm toward the open position.

16. The method of claim 13, wherein the step of moving the trap between the second position and the third position comprises applying a force to the set arm in its open position, which provides a lever that moves the upper jaw toward its open position.

17. The method of claim 13, wherein the latching mechanism comprises a first latch member coupled with the set arm and a corresponding second latch member coupled with the base, whereby the first and second latch members engage when the latching mechanism is in its latched position.

18. The method of claim 13, further comprising the step of moving the latching mechanism from its latched position to its unlatched position, thereby releasing the upper jaw to move from its open position to its closed position.

19. The method of claim 18, whereby the trap comprises a trigger that is operably coupled with the latching mechanism, and the step of moving the latching mechanism from its latched position to its unlatched position comprises activating the trigger.

* * * * *